April 11, 1939. F. B. MacLAREN, JR 2,153,986
ELECTRONIC CONTROL SYSTEM FOR SELF-BALANCING MEASURING INSTRUMENTS
Filed Nov. 15, 1937
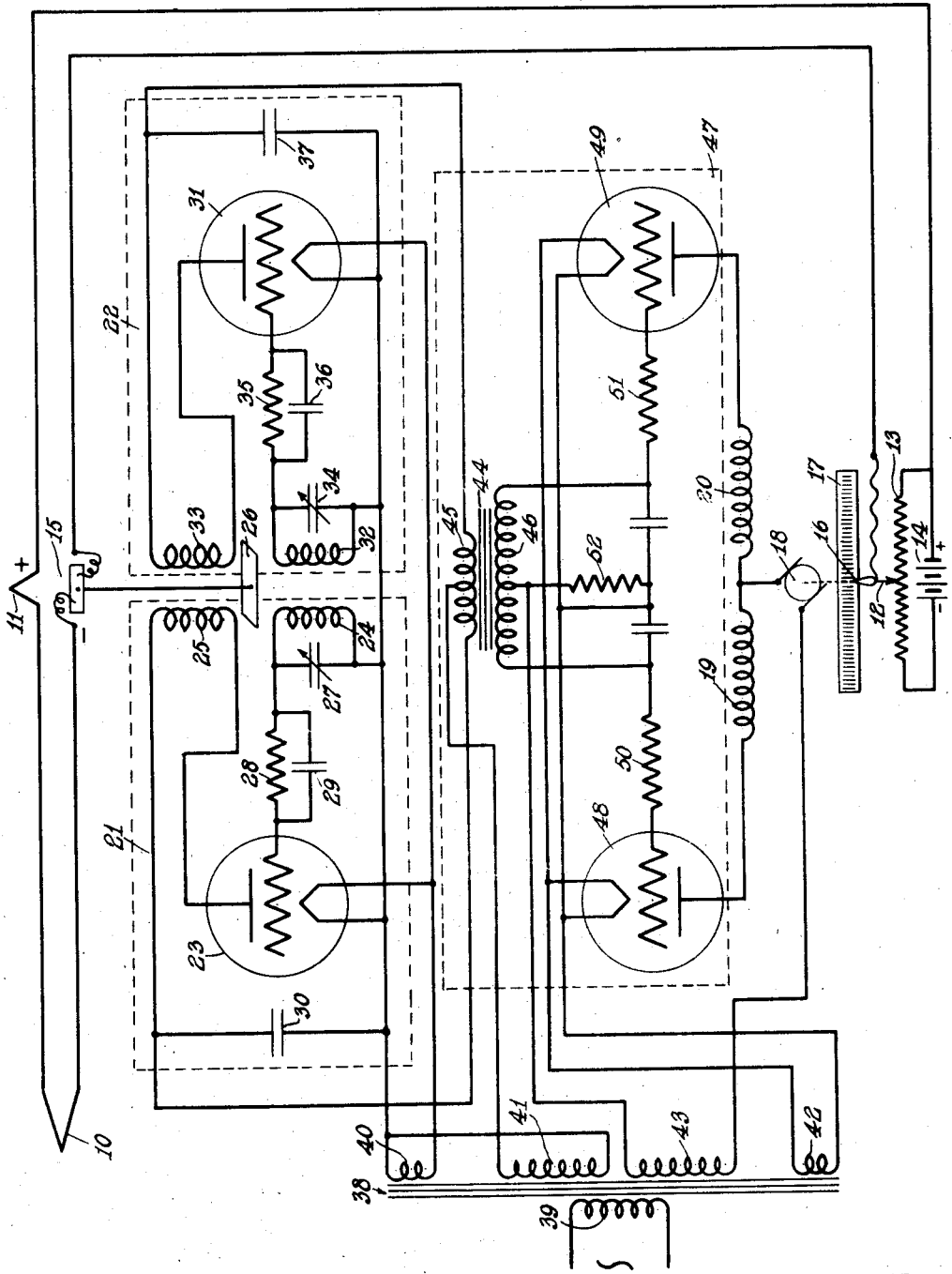
INVENTOR.
FRED B. MACLAREN, JR.
BY
ATTORNEY.

Patented Apr. 11, 1939

2,153,986

UNITED STATES PATENT OFFICE 2,153,986

ELECTRONIC CONTROL SYSTEM FOR SELF-BALANCING MEASURING INSTRUMENTS

Fred B. MacLaren, Jr., Waterbury, Conn., assignor to The Bristol Company, Waterbury, Conn., a corporation of Connecticut Application November 15, 1937, Serial No. 174,615

8 Claims. (Cl. 172—239)

This invention relates to electrical control systems, and more particularly to an electronic control system embodying a self-balancing instrument, such as a recording potentiometer, in which the balancing action is made subject to the deflections of a galvanometer, through the medium of oscillating circuits including thermionic tubes.

It is an object of this invention to provide a control system of the nature specified, which shall operate without mechanical engagement of the galvanometer pointer at any time.

A further object is to provide a control system including a motor and motor circuit for restoring a balanced condition and wherein no electrical contacts are involved.

Another object is to provide a control system which shall be especially sensitive to changes in the controlled condition, and which embodies relatively simple electrical circuits and electronic devices.

A further object resides in the provision of a control system of the nature specified, embodying a balancing motor which may be given the advantageous characteristic of dynamic braking.

A still further object is to secure speedy response to an unbalanced condition, which response varies directly with the degree of unbalance and any tendency to overshoot the balanced position being substantially eliminated.

The single drawing is a diagrammatic representation of the novel control system, embodying an electrical circuit including electronic devices and a self-balancing potentiometer as for measuring the electromotive force developed in a thermoelectric system, in which the control of a condition is effected by the joint operation of the said electrical circuit and potentiometer.

Referring to the drawing, 10 and 11 designate the "hot" and "cold" junctions, respectively, of a thermoelectric couple whose total thermoelectromotive force it is desired to measure by means of the position of a sliding contact 12 engaging a slide-wire element 13, constituting a potential divider and carrying a current of constant value derived from a battery 14. The condition of balance is detected in the usual manner by a galvanometer 15 connected in series with the thermoelectric circuit and the sliding contact 12; and the position of the contact may be indicated by a pointer 16 traversing a graduated scale 17.

A reversible motor 18, having mechanically operative connection to the contact 12 for traversing the same over the slide-wire element 13, is provided with two windings 19 and 20, adapted to exert rotative influences in opposite senses. For example, energization of the winding 19 tends to operate the motor to move the contactor in a sense to increase the proportion of the slide-wire potential included in the circuit in opposition to the thermoelectric force to be measured and developed by the thermocouple 10; and the winding 20 tends to operate the motor in a sense to decrease the amount of said voltage. The motor 18 is also, preferably, of the design in which simultaneous energization of both windings to an equal extent will not only produce a zero rotative influence, but will provide definite dynamic braking, thus tending to bring the motor quickly to rest after operation in either direction.

It will be understood that a condition of unbalance in the potentiometer circuit, resulting from changes in the condition under control, causes a flow of current in the galvanometer coil and a corresponding deflection, the direction of the deflection depending on the direction of the unbalance. The means for obtaining primary response to deflections of the galvanometer 15 comprises a pair of identical electrical oscillatory circuit systems 21 and 22, arranged as follows: Oscillating circuit system 21 includes a three-element thermionic tube 23 which has connected between its grid and its cathode a coil 24, mechanically juxtaposed to, and having a degree of magnetic linkage with, a coil 25 connected in the output circuit of the same thermionic tube.

Carried by the galvanometer 15, and moving when the same is deflected, is a vane 26 of light-weight, electrically-conducting material, the same being adapted to intersect the common magnetic circuit of the coils 24 and 25; and, by virtue of eddy currents induced in the vane when currents of oscillatory frequency are flowing in either of said coils, said vane is designed to affect the magnetic linkage or mutual inductance between the same, thereby producing a shielding effect. According to principles well known to the art, the magnitude of the oscillations in the circuit containing the coils 24 and 25 will be affected by the extent to which the vane 26 shields one from the other; and the nature of change of this effect in response to a given movement of the vane will also depend upon the relative polarity of the coils.

A tuning condenser 27 connected in parallel with the coil 24 constitutes therewith an electrically resonant system, serving to establish the frequency of oscillation of the associated circuit. It will be obvious, moreover, that under conditions of oscillation there will be developed between the grid and the cathode of tube 23 an alternating potential of the oscillation frequency; and, because of the fact that current will pass in one direction from cathode to grid when the grid is at a positive potential with respect to the cathode, a unidirectional pulsating current will flow in the grid circuit. A grid-leak resistance 28, connected in series with the grid of tube 23, will have developed across its terminals a unidirectional potential, whose average value will bias the tube negatively, causing a decrease in the value of plate current from the value which otherwise might flow. A suitable condenser 29, in parallel with the resistance 28, will act to by-pass the pulsating component of the current in the grid circuit and retain its charge over the half cycle where no grid current flows; and a suitable condenser 30 connected between the cathode of the tube and the free end of the coil 25 will provide a path for the oscillatory component of current in the plate circuit of the tube and in the coil 25.

The other oscillating circuit system 22 is in all respects identical with the circuit system 21, and includes a three-element thermionic tube 31, having in its grid and plate circuits respectively coils 32 and 33 with a degree of magnetic interlinkage, and in whose common field may pass the shielding vane 26 when deflected away from its association with the coils 24 and 25. A tuning condenser 34 is connected in parallel with the coil 32 for establishing the period of oscillation; and there is provided a grid-leak resistance 35 having a parallel condenser 36, together with a by-passing condenser 37 between the plate circuit and the cathode of the tube 31.

Power for the operation of the tubes and associated oscillating circuits is derived from a transformer 38 having a single primary winding 39 connected to a suitable source of alternating current supply. The secondary provides a filament current winding 40 and a plate voltage winding 41, operatively connected, as shown, to the filament and plate systems of the oscillating circuit systems 21 and 22, together with an additional filament current winding 42 and a plate voltage winding 43, the purpose of which will hereinafter be set forth. The filaments of the tubes 23 and 31 are connected in parallel to the winding 40 of the transformer 38.

A transformer 44 is provided with a primary winding 45 and with a secondary winding 46, each winding being tapped at its mid-point. The mid-point of the primary winding 45 is connected to one terminal of the plate voltage winding 41 of the transformer 38, the other terminal of said transformer winding being connected to the circuit supplying the filaments 23 and 31.

Operation of the balancing motor 18 is effected through the medium of a relay circuit system 47, including a pair of similar grid-controlled rectifiers ("thyratrons") 48 and 49, having their cathode heating circuits supplied with current from the secondary winding 42 of the transformer 38, and their grids connected through suitable grid-leak resistors 50 and 51 to the left-and right-hand ends, respectively, as seen in the drawing, of the secondary winding 46 of the transformer 44, thus constituting a network adapted to utilize the well-known threshold effect characterizing grid-controlled rectifiers of this class, and providing "trigger circuits" for the same. One terminal of the secondary winding 43 is connected to the mid-point of the secondary winding 46, and, through a biasing resistor 52, to the common cathode circuit of the "thyratron" tubes. It will be obvious to those versed in the art that while the grid-controlled rectifiers provide a preferred construction, a similar performance may be obtained by the substitution of other types of thermionic triodes for the same, whereupon the "trigger" or threshold effect may be replaced by an amplifying effect which may be utilized in a like manner, as hereinafter set forth.

The plates of the tubes 48 and 49 are connected to the opposed windings 19 and 20 respectively of the motor 18, and through said motor to the terminal of transformer winding 43 to afford respective control circuits for the said motor. The value of the resistor 52 may be either such that the tubes 48 and 49 will be biased to a point just above cut-off, when, under balanced conditions, no current will flow in either winding of the motor 18; or it may be such that the rectifying tubes are biased to a point just below cut-off, when, under balanced conditions, the respective motor windings will be carrying currents of equal and opposed influence, so that the motor will remain at rest and will have dynamic braking. In general, operation of the motor 16 will be determined by the predominance of one over the other of currents flowing in its respective windings.

The performance of the control system under operating conditions may be described as follows: Assuming first a condition of balance to exist in the thermocouple circuit, the sliding contact 12 being in such a position on the slide-wire 13 that the thermoelectromotive force in the thermocouple circuit is exactly opposed by the selected portion of the battery 14, no current will be flowing in the galvanometer 15, and the shielding vane 26 will rest in a neutral zone just outside the fields of the two feedback coil units of the two oscillating circuit systems. Under this condition both the circuit systems 21 and 22 will oscillate when their respective coils are properly polarized and, when properly adjusted, will have equal currents flowing in their plate circuits, which currents, passing through the two opposed sections of the primary winding 45 of the transformer 46, will neutralize their magnetic effects, with a resulting zero voltage in the secondary winding. Thus, the grid-controlled tubes 48 and 49, being normally biased alike, as hereinabove set forth, will produce no unbalance current in the windings of the motor 18, which will consequently remain at rest.

Assume now an increase in the total electromotive force in the thermocouple circuit, due to a rise in the temperature to which the junction 10 is exposed. This will produce a condition of electrical unbalance in the circuit, which will cause a current to flow in the galvanometer 15, whose polarity has been selected such that the vane 26 will be deflected toward the left as seen in the diagram, shielding the coil 24 from the coil 25. With these coils of polarity to establish the required phase relations, the result will be to reduce or check the oscillations of circuit system 21, with a corresponding reduction in the biasing potential between the grid and cathode of tube 23, and a consequent increase in plate current fed from the transformer winding 41. The half-wave plate current in tube 23 will flow in the left-hand half of the winding 45 of transformer 44, upsetting thereby the normally balanced condition, and inducing an alternating voltage in its secondary winding 46. The voltage across the left-hand half of the winding 46 will be 180° out of phase with the voltage across the right-hand half of winding 46, and one of these voltages will be in phase with the plate voltage of the "thyratron" tubes 48 and 49, since they are fed from the same transformer as the tubes 23 and 31. In one of the tubes 48 and 49, therefore, the grid will be negative with respect to the cathode during the time that the plate is positive with respect to the cathode, thus producing a negative bias and preventing plate current flow—it being understood that plate current can flow only when the anode is positive with respect to the cathode. The grid of the other "thyratron", being at a potential 180° out of phase with the aforementioned grid, will be negative with respect to the cathode when the plate is negative with respect to the cathode and positive when the plate is positive, so that plate current will flow.

The winding 19 of the motor 18 will thus be energized, causing the motor to operate and to move the sliding contact 12 along the slide-wire 13 in a sense to increase the potential opposed to that of the thermocouple system, and to restore a condition of balanced potential in the thermoelectric circuit, reducing to zero the current in galvanometer 15, allowing the vane 26 to return to its neutral position, and normal oscillatory conditions to be restored in the circuit.

In a similar manner, should there take place a lowering of the temperature to which the thermocouple 10 is exposed, causing in the thermoelectric circuit a change of potential tending to deflect the galvanometer toward the right, the vane 26 will tend to reduce oscillations in the circuit system 22, allowing current to flow in the right-hand half of the winding 45 of transformer 44, and effecting the bias tube 49 to cause the motor 18 to act in a sense to decrease the potential opposed to the thermoelectromotive force, again tending to restore balanced electrical conditions throughout the potentiometer system.

Thus, it will be apparent that the position of the sliding contact 12 along the slide-wire 13, and therefore of the pointer 16 on the graduated scale 17, becomes a measure of the total thermoelectromotive force in the thermoelectric circuit, and thus of the temperature to which the "hot" junction 10 is exposed. It is obvious that the pointer 16 traversing the scale 17 may be replaced by any of the well-known forms of recording device, embodying a pen or stylus traversing a travelling paper chart (not shown), thus providing a continuously recording potentiometer.

It will further be obvious that the application of the balancing combination need not be restricted to its use with a potentiometric type of measuring circuit, but may with equal facility be associated with any type of electrical bridge circuit, or with any form of mechanical instrument to which the "null" method of measurement may be adapted.

It will be apparent to those versed in the art that in addition to the hereinabove mentioned alternative of having the plate currents of the grid-controlled rectifier tubes 48 and 49 either of zero value or of equal and opposite values, there may be introduced other alternatives without departing from the spirit of the invention. It is obvious, for example, that instead of the circuit systems 21 and 22 being normally oscillating and adapted to be thrown out of oscillation by deflection of the galvanometer away from its neutral position, the said circuit systems and the vane 26 may be so modified, as by reversing one of the coils and by proper adjustment of the circuit constants, that the circuit systems 21 and 22 will be normally non-oscillating, either one or the other being thrown into oscillation upon deflection of the galvanometer, and thereby reacting upon the grid-controlled rectifier tubes in the relay circuit to produce corresponding operation of the balancing motor.

Moreover, the invention is not restricted to the particular type of the oscillation systems shown; nor is it restricted to the "thyratron" relay system, as standard electromagnetic relays may be utilized in the usual manner. Also, the motor utilized for restoring the balance in the potentiometer circuit may be either of the induction type or of the commutating type.

I claim:

1. In a system of control and/or measurement and including a null method measuring system subject to unbalance, with electric motor means for reestablishing a balance in said system, and a sensitive member responsive to conditions of unbalance: electronic means affording an oscillatory circuit; relays means controlling operation of the said motor means, together with electrical connections between said relay means and said circuit including means for rendering said relay means responsive to variations in the oscillatory condition of said circuit; and means to change the intensity of the feed-back in said oscillatory circuit and actuated by the said sensitive member.

2. In a system of control and/or measurement and including a thermocouple responsive to temperature changes, a galvanometer and potentiometer associated therewith to afford a null method measuring system for the temperatures to which said couple is exposed, and a reversible electric motor for reestablishing a balance in said system: electronic means affording an oscillatory circuit; relay means controlling operation of the said motor means, together with electrical connections between said relay means and said circuit including means for rendering said relay means responsive to variations in the oscillatory condition of said circuit; and means controlled by the said galvanometer to change the intensity of the feed-back in said oscillatory circuit to effect operation of said relay means.

3. The combination with a null method measuring system subject to unbalance and including electric motor means for establishing a balance in said system, and a sensitive member responsive to conditions of unbalance: of a pair of electrical networks each including thermionic means provided with input and output circuits, means for providing inductive interlinkages between the input and output circuits in each of said networks, whereby oscillatory conditions may be maintained independently in each network, and a relay means including a pair of thermionic devices, each provided with a trigger circuit and a control circuit, the latter being adapted to actuate said motor means in respectively opposite senses, and said trigger circuits being respectively responsive to changes in the non-pulsating component of plate current, which varies according to the oscillatory conditions of said pair of networks, together with means actuated by said sensitive member to change the intensity of the feed-back in each of said networks.

4. The combination with a null method measuring system subject to unbalance and including electric motor means for establishing a balance in said system, and a sensitive member responsive to conditions of unbalance: of a pair of electrical networks each including thermionic means provided with input and output circuits, means for providing inductive interlinkages between the input and output circuits in each of said networks, whereby oscillatory conditions may be maintained independently in each network, and a relay means including a pair of thermionic devices, each provided with a trigger circuit and a control circuit, the latter being adapted to actuate said motor means in respectively opposite senses, and said trigger circuits being respectively responsive to changes in the non-pulsating component of plate current due to variation in the oscillatory conditions of said pair of networks, together with means actuated by said sensitive member to change simultaneously the intensity of the feed-back in each of said networks.

5. The combination with a null method measuring system subject to unbalance and including electric motor means for establishing a balance in said system and a sensitive member responsive to conditions of unbalance: of a pair of oscillatory circuits including amplification means, electromagnetic shielding means whereby said circuits are rendered oppositely responsive to deflections of said sensitive member to change the intensity of feed-back in said circuits, and a relay system including thermionic devices responsive to the oscillatory conditions of said oscillatory circuits and adapted to command response of said motor means.

6. The combination with a null method measuring system subject to unbalance and including electric motor means for establishing a balance in said system and galvanometer means responsive to conditions of unbalance: of a pair of oscillatory circuits including amplification means, electromagnetic shielding means whereby said circuits are rendered oppositely responsive to deflections of said galvanometer means to change the intensity of feed-back in said circuits, and a relay system including thermionic devices responsive to the oscillatory conditions of said oscillatory circuits and adapted to command response of said motor means.

7. The combination with a null method measuring system subject to unbalance and including electric motor means for establishing a balance in said system and a sensitive member responsive to conditions of unbalance: of a pair of thermionic tubes affording oscillatory circuits and output circuits, electromagnetic shielding means whereby said oscillatory circuits are rendered oppositely responsive to deflections of said sensitive member to change the intensity of feed-back in said circuits, and a relay system including thermionic devices associated with the respective output circuits and responsive to the oscillatory conditions of said oscillatory circuits and adapted to command response of said motor means.

8. The combination with a null method measuring system subject to unbalance and including electric motor means for establishing a balance in said system and a sensitive member responsive to conditions of unbalance: of a pair of electrical oscillatory circuits including thermionic devices, electromagnetic shielding means actuated by said sensitive member to change the intensity of feed-back in said circuits, and amplification means, subject to variations in the output current of said thermionic devices, to command response of said motor means.

FRED B. MacLAREN, Jr.